United States Patent [19]
Farrar

[11] Patent Number: 5,553,996
[45] Date of Patent: Sep. 10, 1996

[54] WIND POWERED TURBINE

[76] Inventor: Austin P. Farrar, Orchard House, Stutton, Ipswich, Suffolk, IP9 2RY, United Kingdom

[21] Appl. No.: 189,438

[22] Filed: Jan. 31, 1994

[30] Foreign Application Priority Data

Feb. 10, 1993 [GB] United Kingdom .................. 9302648

[51] Int. Cl.$^6$ .................................................. F03D 7/00
[52] U.S. Cl. .............................................. 415/2.1; 415/4.2
[58] Field of Search ........................... 415/2.1, 4.2, 4.4, 415/905, 907; 416/119

[56] References Cited

U.S. PATENT DOCUMENTS

| | | | |
|---|---|---|---|
| 266,667 | 10/1882 | Young | 416/119 |
| 665,804 | 1/1901 | Savage | 416/119 |
| 1,367,766 | 2/1921 | Bozied . | |
| 2,667,589 | 1/1954 | Levrero . | |
| 4,004,861 | 1/1977 | Soules . | |
| 4,047,834 | 9/1977 | Magoveny et al. . | |
| 4,052,134 | 10/1977 | Rumsey . | |
| 4,061,926 | 12/1977 | Peed . | |
| 4,115,032 | 9/1978 | Lange . | |
| 4,129,787 | 12/1978 | Palma . | |
| 4,156,580 | 5/1979 | Pohl . | |
| 4,255,085 | 3/1981 | Evans . | |
| 4,278,894 | 7/1981 | Ciman . | |
| 4,359,311 | 11/1982 | Benesh . | |
| 4,424,002 | 1/1984 | Nishiyama | 416/119 |
| 4,428,711 | 1/1984 | Archer . | |
| 4,566,853 | 1/1986 | Likitanupak . | |
| 4,616,973 | 10/1986 | Souchik, Jr. . | |
| 4,715,776 | 12/1987 | Benesh . | |
| 4,799,860 | 1/1989 | Martin . | |
| 4,830,570 | 5/1989 | Benesh . | |
| 4,970,404 | 11/1990 | Barger . | |
| 5,051,059 | 9/1991 | Rademacher . | |
| 5,083,901 | 1/1992 | Griffin, Jr. et al. . | |

FOREIGN PATENT DOCUMENTS

| | | |
|---|---|---|
| 0268855 | 6/1988 | European Pat. Off. . |
| 2292128 | 6/1976 | France . |
| 2289764 | 7/1976 | France . |
| 2461119 | 7/1979 | France . |
| 2465898 | 4/1981 | France . |
| 2465897 | 4/1981 | France . |
| 2473638 | 7/1981 | France . |
| 2492897 | 4/1982 | France . |
| 2492005 | 4/1982 | France . |
| 2492007 | 4/1982 | France . |
| 2629523 | 10/1989 | France . |
| 604333 | 10/1934 | Germany . |
| 2638007 | 3/1978 | Germany . |
| 3003270 | 6/1981 | Germany . |
| 3835387 | 4/1989 | Germany . |
| 8904484 | 7/1989 | Germany . |
| 189751 | 4/1924 | United Kingdom . |
| 270858 | 5/1927 | United Kingdom . |
| 946685 | 1/1964 | United Kingdom . |
| 1146679 | 3/1969 | United Kingdom . |
| 1452483 | 10/1976 | United Kingdom . |
| 1456128 | 11/1976 | United Kingdom . |
| 1461676 | 1/1977 | United Kingdom . |
| 1481699 | 8/1977 | United Kingdom . |
| 1486338 | 9/1977 | United Kingdom . |
| 2074660 | 11/1981 | United Kingdom . |
| 82/02747 | 8/1982 | WIPO . |
| 89/05403 | 6/1989 | WIPO . |
| 89/07713 | 8/1989 | WIPO . |

OTHER PUBLICATIONS

Dr. Peter Musgrove, Department of Engineering, Reading University, The Reading University Variable Geometry Vertical Axis Windmill, pp. 52–54.

*Primary Examiner*—John T. Kwon
*Attorney, Agent, or Firm*—Howell & Haferkamp, L.C.

[57] ABSTRACT

A wind powered turbine comprises a plurality of vanes 1 tangentially angled about the axis 2 of a drum-like frame. The frame is arranged to rotate about its longitudinal axis 2 and it has a tubular member 5 mounted co-axially with the longitudinal axis 2, within the path swept by the vanes 1 as they rotate. The tubular member 5 constrains the wind to follow an arcuate path between entry and exit points where it reacts with the vanes 1 of the turbine.

17 Claims, 3 Drawing Sheets

WIND POWERED TURBINE

The present invention relates to a wind powered turbine comprising a wheel or drum of vanes to be driven by reaction with the wind. The invention may be used to generate electricity or to drive other engines, such as ships' engines.

BACKGROUND TO THE INVENTION

It is known to use a windmill type of mechanism coupled to a generator to provide electrical power as the wind rotates the blades, sails, or vanes of the windmill. However such conventional axial flow windmill mechanisms are costly. They need to be mounted high above the ground on a substantial standing structure to allow the blades to rotate. Such horizontal axis windmills also require constant adjustment so as to maintain their direction into the wind. Their speed needs to be governed for safety, but they are still vulnerable in storm conditions even when stopped. They are subject to fluctuating loading in the blades leading to fatigue stresses, caused by the effective wind speed being different at the top and bottom of their rotative cycle, and interference by the supporting structure.

A number of attempts have been made to design a more cost-effective wind powered generator. Thus, it has been proposed to provide two semi-circular vanes, rotationally mounted directly on the ground about a vertical axis so that each vane overlaps the other at the axis by about one third of their diameter so as to create a general letter "S" cross-sectional profile. Such a device is generally known as a Savonius turbine and, though it is simple to construct, support and operate as a self-starting turbine which is independent of the wind direction it has a relatively low output efficiency.

Attempts have been made to improve the efficiency by increasing the number of semi-circular vanes arranged about the vertical axis. However, the addition of a third or other blades does not significantly increase the efficiency of the arrangement although it remains self-starting.

There is an improvement in efficiency with the Darrieus rotor, invented by a Frenchman of that name in 1927. This turbine consists of three half rings of aerofoil section rotatably mounted top and bottom about a vertical axis. The principle of operation of the Darrieus rotor is the use of vanes each of which forms one half of a Torneau ring which has negative drag. Such an arrangement is efficient but is not self-starting, and requires running up to a critical speed at which it is self sustaining. A Savononius turbine is often mounted on the axis of a Darrieus rotor to provide the self-starting feature. Alternatively a motor is required to start the Darrieus turbine, and this adds to the costs.

From work done by Dr P. Musgrove and his students at Reading University it is known to provide two vertical symmetrical section vanes set on opposite ends of an horizontal arm mounted on a vertical axis and operating on the general principle of the Darrieus. Such an arrangement is not self-starting and it has other disadvantages, the main one being that the rotor varies in speed at different points in its cycle causing fluctuating current output and stress loads on the vanes, bearings and structure.

The safety factor with efficient turbines becomes significant for higher wind speeds. Special precautions need to be taken to prevent the disastrous accidents which have occurred with windmills and known turbines in storm or hurricane force winds. Generally powerful braking is required to limit the rotational speed even when a feathering control is applied to the blades or vanes.

In summary, the factors which should be considered in the provision of a commercially viable machine are:

(1) the need to avoid tall substantial structures to support the turbine;

(2) the need to react to the wind over a wide range of wind speeds with a substantially constant power output;

(3) the need to react to the wind regardless of direction so avoiding continual re-orientation to ensure that the windmill always points into the wind;

(4) the need to reduce manufacturing costs and increase power output efficiency;

(5) the need to eliminate the use of a step-up gearbox to drive a generator at an efficient speed by a slow turning rotor;

(6) the need to be self-starting; and (7) the need to reduce excessive stresses generated in the structure at high wind speeds.

It is an object of the present invention to provide a cost-efficient wind powered turbine which is self-starting, substantially independent of wind direction and speed and which can be mounted on a low tower about a vertical axis of rotation.

It is a further object of the present invention to reduce the need for a gearbox by enabling the turbine to be connected to a large diameter, slow turning generator.

SUMMARY OF THE INVENTION

According to the present invention there is provided a wind powered turbine for driving an engine, comprising a plurality of vanes tangentially angled about the axis of a drum-like frame arranged to rotate about its longitudinal axis and having a tubular member mounted co-axially with the longitudinal axis and within the path swept by the vanes as they rotate so as to constrain the wind to follow an arcuate path between entry and exit points where it reacts with the vanes of the turbine.

According to a further aspect of the invention there is provided a wind powered turbine comprising a plurality of vanes mounted to rotate, under reaction to the wind, in a circle about a vertical axis, said vanes being inclined to the tangent of the circle of rotation so that wind which provides rotational power to the turbine as it is deflected by the vanes inside the circle of rotation is constrained to follow an arcuate path before it exits from the circle to provide additional positive rotational power by further reaction on the vanes.

The turbine may be mounted with the axis substantially vertical so that it reacts to the wind regardless of wind direction.

The tangential angle of the vanes may be varied according to wind speed and the power output requirements. When the wind is blowing strongly, for example, the tangential angle of the vanes may be narrowed so as to reduce the speed of rotation relative to a high tangential angle. Conversely, at low wind speeds the tangential angle of the vanes may be increased. By varying the angle of the vanes according to wind speed the turbine may be adjusted to provide substantially constant power output. If the wind blows very strongly the angle of the vanes may be adjusted so that they form a substantially closed tube with relatively little wind resistance, thereby reducing the risk of damage to the turbine or its supporting structure. The angle of the vanes may be preset, manually adjusted or automatically adjusted depending upon wind speed and power output requirements.

The vanes are preferably of aerofoil section although straight or curved slats are effective. The axis about which the vanes are arranged to pivot may be offset from the profile of the vane.

Accordingly a preferred embodiment of the invention provides a wind powered turbine for driving an engine, comprising a plurality of vanes of aerofoil section tangentially angled about the axis of a drum-like frame arranged to rotate about its longitudinal axis and having a tubular member mounted co-axially with the longitudinal axis and within the path swept by the vanes as they rotate so as to constrain the wind to follow an arcuate path between entry and exit points where it reacts with the vanes of the turbine.

To prevent end losses of the wind passing through the turbine between entry and exit points, the drum-like frame may be provided with end-plates. The end-plates may extend beyond the path swept by the vanes to assist wind alignment, particularly at the entry and exit points.

The tubular member may contain, or be operatively connected to, an electric generator.

It is possible to provide two wind powered turbines according to the invention one above the other on a common axis of rotation but arranged to rotate in opposite directions so that the stator of an electric generator within the tubular member is coupled to one of the turbines, and the rotor to the other turbine so that the relative rotational speed for the generator is the sum of the rotational speeds of the two turbines.

The turbine is also suitable for connection to a large diameter, slow turning generator, thereby removing the need for a gearbox.

BRIEF DESCRIPTION OF THE DRAWINGS

The invention will now be described, by way of example, with reference to the accompanying diagrammatic drawing in which:

Referring now to the drawing, FIG. 1 shows a number of turbine vanes 1 mounted about a axis of rotation 2 by means of pins 3 in an end-plate 4. A tubular member 5 of cylindrical section coaxial with the axis 2 lays inside the circle on which the pins 3 are located. The direction of the wind is illustrated by a series of arrows A which represent the direction (but not the velocity) of the wind when the turbine is operated.

It will be seen that as the wind strikes the turbine it is deflected into the core of the turbine on the left-hand (down-stream) side so that the vanes 1 act as paddles which react against the force of the wind to start the turbine rotating. Because of the angle of the vanes on the right-hand (up-stream) of the turbine the wind is deflected across the outer surface of the vane which tends to draw air from the underside of the vanes according to a known aerofoil effect. The tubular member 5 causes the wind which is trapped within the turbine blades to follow an arcuate path from each entry point to exit point where it exits between the vanes over the up-stream travel of the vanes. This flow of air from within the turbine adds a positive thrust to the turbine.

By using a transparent plastic end-plate 4 and a series of smoke streams within a wind tunnel, the wind flow around and within the turbine could be photographed and analyzed. From the analysis it was possible to see the different effects produced by vane shape and angle of attack. It will be seen that the tubular member 5 prevents the air trapped within the turbine at an entry point from taking the direct path to an exit point. Because the air is forced around an arcuate path between the rotating vanes and the tubular member 5 within the turbine this ensures that the wind is vented almost entirely on the up-stream passage of the vanes. By venting the wind on the up-stream path it will be seen that a large part of the wind energy has been removed. The majority of the wind is vented at B as shown on FIG. 1 where the down-stream motion starts to turn to up-stream motion.

Figure 1:
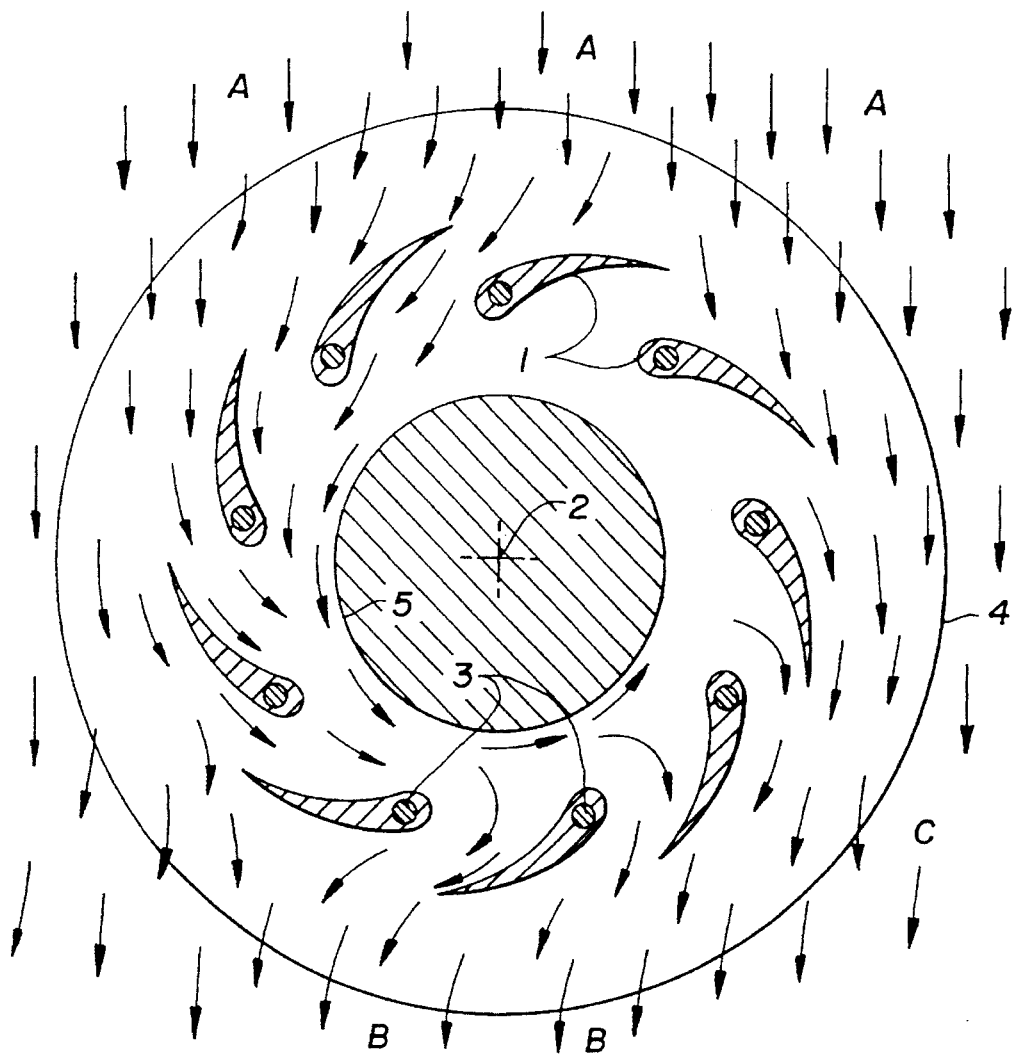
FIG. 1 shows in plan view a horizontal section through a wind powered turbine.

On the up-stream side, beyond the point C as shown in FIG. 1, where the wind ceases to be deflected from the rotating vanes, the smoke analysis shows that over approximately 90° between C and A the aerofoil section of the vanes produces a positive up-wind force, each vane in turn acting as a leading edge slat to the following vane. This was demonstrated in the wind tunnel by shutting off the flow of wind on the down-stream side of the rotor. The wind on the up-stream side would then cause the rotor to start and turn to windward, indicating that in normal use the rotor produces power during practically 360° of its rotation.

Figure 2:
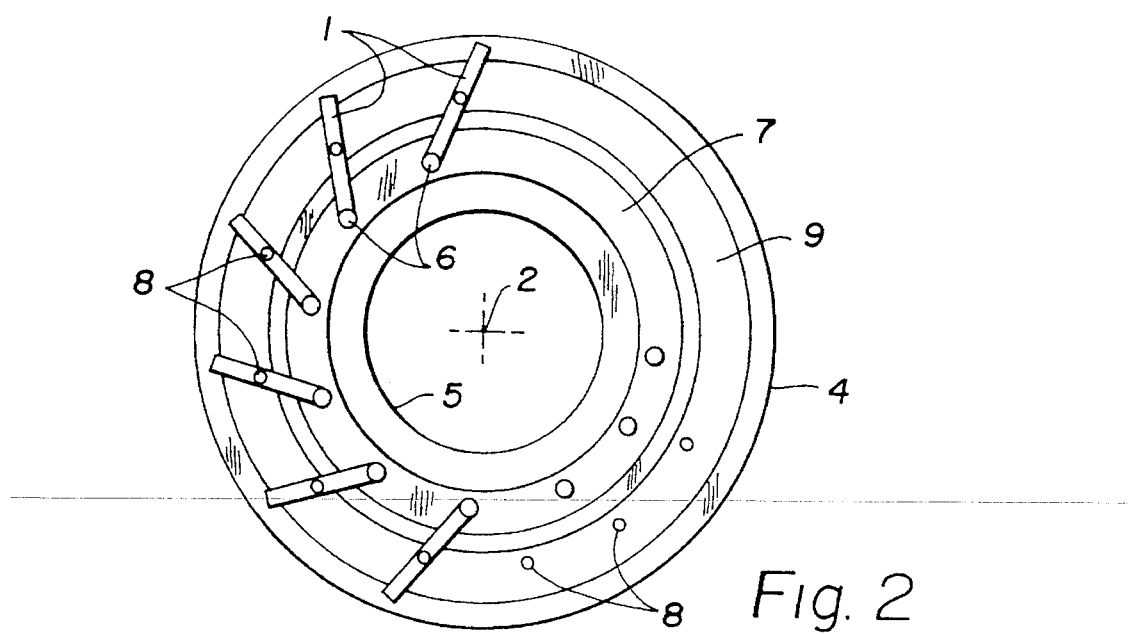
FIG. 2 shows an adjustable end-plate mounting arrangement for the turbine.

Referring now also to FIG. 2 this shows a means for adjusting the angle of attack of the turbine vanes 1. As shown in FIG. 2 the vanes may be parallel sided laths connected at one end by pivot pins 6 to a ring 7 on the end-plate 4, and connected toward their other end by a slider pin 8 on a ring 9 capable of rotational adjustment relative to the ring 7. The slider pins 8 co-operate with slots in the vanes 1.

The angle of attack of the vanes 1 enables the speed of the turbine to be controlled at a substantially constant speed over a wide range of wind speeds.

Referring again to FIG. 2 a known form of governor may be used to adjust the relative positions of the rings 7 and 9 and hence to adjust the angle of attack of the vanes 1. Alternatively the relative position of the rings 7 and 9 may be manually adjusted. It will be appreciated that as the angle of attack of a blade increases from zero so the reaction to the wind increases and hence the power output increases.

Figure 3:
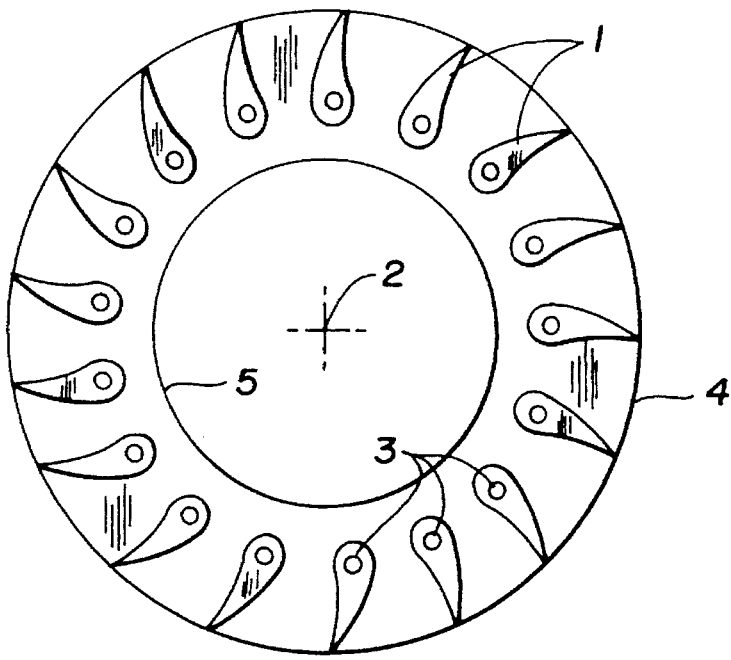
FIG. 3 shows a turbine with vanes set for low wind speed.
Figure 4:
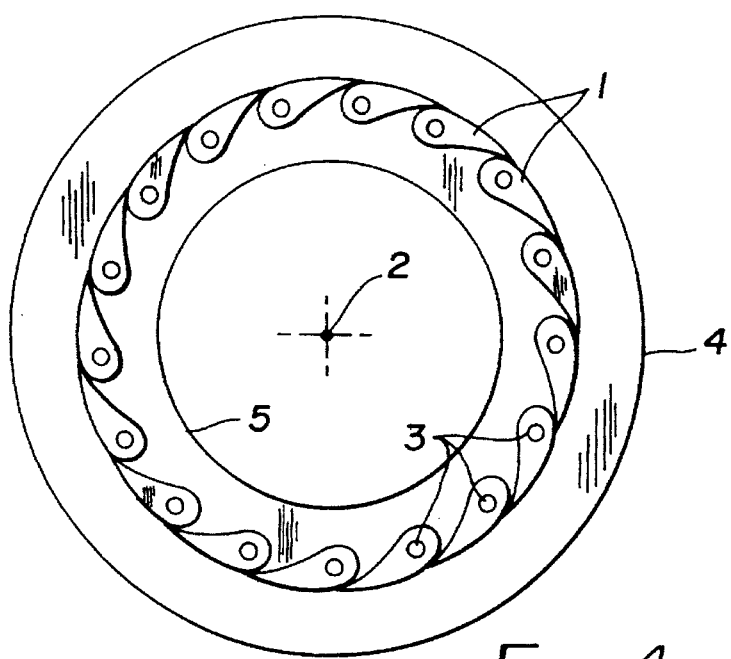
FIG. 4 shows the turbine with the vanes set for zero output.

FIGS. 3 and 4 illustrate the two extremes of control for the angle of attack of the vanes. In FIG. 3 the angle of attack is at its greatest which is applicable to low wind speeds. As the turbine is symmetrical the direction of the wind relative to the turbine will not affect its output.

FIG. 4 shows the vane position for zero output. As the vanes are touching and form a substantially closed cylinder there will be no rotational reaction to the wind. In this position, as shown in FIG. 4, the tangential angle of the vanes is defined as zero. By increasing the tangential angle of the vanes (ie the angle of the blades at a tangent to the circle of rotation through the pivot pins) the wind will catch the turbine vanes on the down-stream side and the turbine will start to rotate. The velocity of the wind may be used to adjust automatically the angle of attack of the vanes so that the power output is maintained substantially constant.

It was found that although the turbine was effective when the vanes were supported on an open ended frame, the efficiency was improved by the use of an end-plate which extended beyond the cylinder of rotation swept by the vanes. The available power output will be determined largely by the size of the turbine, however the size of the tubular member 5 within the turbine will also affect the amount by which the wind is diverted around an arcuate path in accordance with the invention. The tubular member 5 may form the shaft of the turbine so that it rotates with the vanes 1, alternatively it may be static. The tubular member 5 of generally circular cylindrical section may contain the electric generator driven by the turbine. If two turbines are mounted co-axially and arranged so that they rotate in opposite directions the stator of the electric generator may be coupled to one turbine and the rotor of the generator may be coupled to the other turbine so that the rotational speed of the generator is the sum of the rotational speeds of the turbines. It is therefore possible to stop one of the turbines by holding it with the vanes set as shown in FIG. 4 and allowing the other turbine only to rotate. For low wind speeds both turbines may be brought into effect to increase the speed of the generator.

Figure 5:
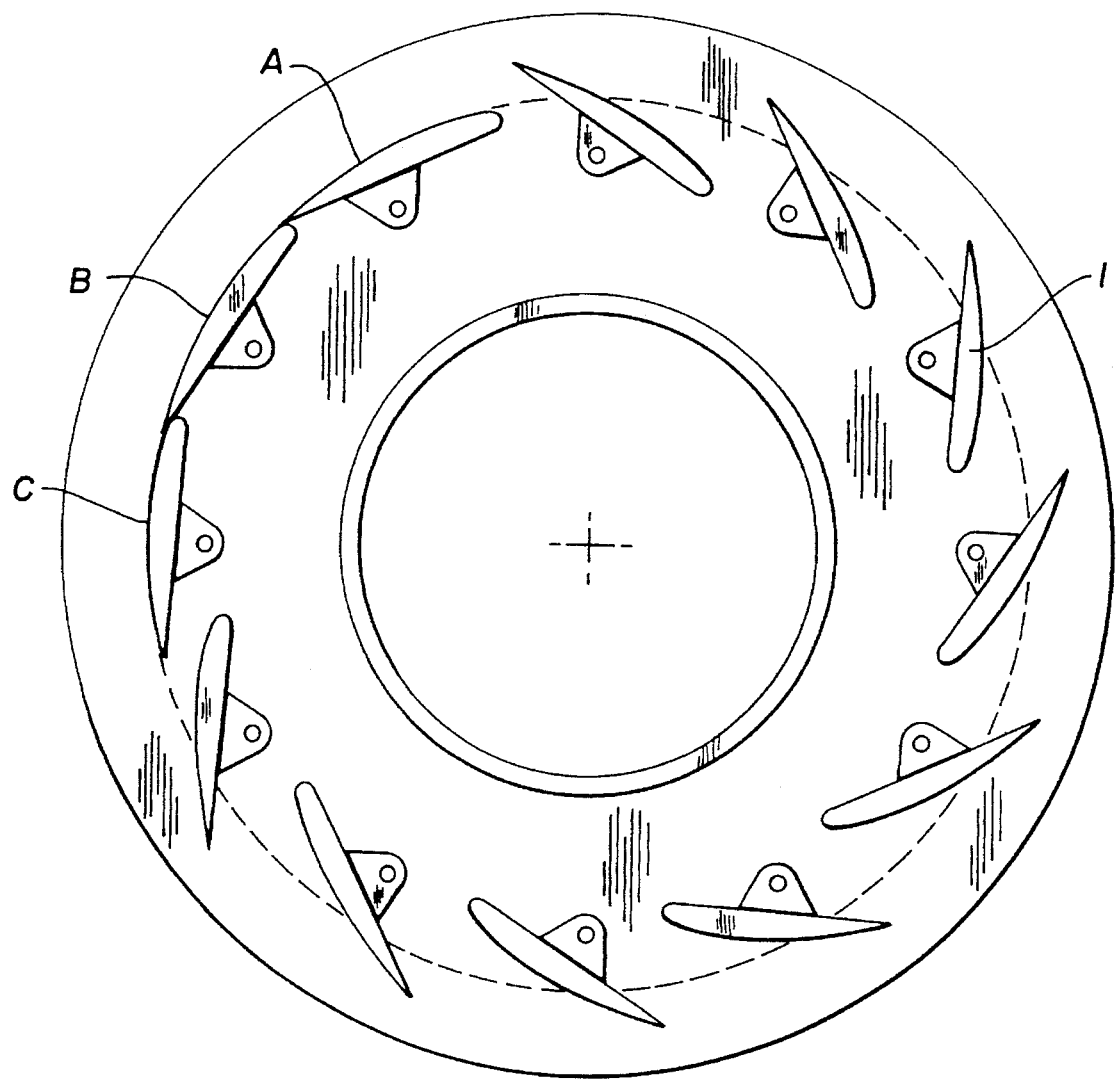
FIG. 5 shows a turbine with vanes of an alternative shape.

FIG. 5 shows an alternative shape of vane 1 which has a substantially flat inner surface and a curved outer facing surface which facilitates manufacture. Here, vanes A, B, C are shown closed, and others are shown in the open or driving position.

It will be appreciated that the present invention has many advantages over known forms of windmills and turbines. Most known motors require a gear box to provide sufficient speed to operate electrical alternators efficiently. Although gearing may be used with the present invention the layout of the turbine lends itself to the use of a large diameter alternator (as large as the turbine itself) turning at rotor speed; and by using two turbines one above the other (as described above) the speed may be increased by control of the vane angle up to double the speed.

The use of multiple vanes in the turbine ensures that its speed will not fluctuate substantially as it rotates, thus producing a smooth generation of electrical power and minimising fatigue stresses. The optimum number of blades which will give sufficiently smooth generation of power and an acceptable level of power generation will vary according to the specific design and size of the turbine, and the application for which it is to be used.

Additionally, the present invention is of inherently safe design as it may be shut down to provide no more resistance to the wind then a cylinder of the diameter of closed vanes. This safety aspect is particularly important if the turbine is used to power a ship as the wind resistance of the ship's superstructure including the turbine must not make the ship unseaworthy.

I claim:

1. A wind powered turbine for driving an engine, comprising a plurality of aerofoil section vanes tangentially angled about a longitudinal axis of a drum-like frame arranged to rotate in a path about its longitudinal axis and having a cylindrical member mounted co-axially with the longitudinal axis and within the path swept by the vanes as they rotate, wherein the vanes are adjustable between a first position at which leading and trailing edges of each vane are at substantially the same distance from the shaft so as to form a substantially closed cylinder, and a second position in which vanes moving into wind add to the rotational forces on the turbine by means of an aerofoil effect, and in which the leading edge of a vane moving into the wind is closer the cylindrical member than the trailing edge so that the vanes cooperate with the cylindrical member to constrain the wind to follow an arcuate path between entry and exit points where it reacts with the vanes of the turbine, each vane having an intermediate region between its leading and trailing edges, and each vane being tapered from its intermediate region to its trailing edge such that the vane has a greater cross-section at its intermediate region than at its trailing edge.

2. A turbine as claimed in claim 1, wherein turning of the turbine with the vanes in the second position is induced by a combination of wind pushing against inward facing surfaces of vanes on the downstream side, and an aerofoil effect from vanes on the upstream side, the aerofoil effect being enhanced by wind which exits on the upstream side after following the arcuate path.

3. A turbine as claimed in claim 1, wherein the angle of the vanes is adjusted automatically in response to changes in velocity of the wind so as to produce a substantially constant power output.

4. A turbine as claimed in claim 1, wherein the number of vanes is in the range 9 to 17.

5. A turbine as claimed in claim 1 wherein the cylindrical member has a cylindrical outer surface and wherein each vane is arcuate and has an interior surface that faces inwardly toward the cylindrical outer surface of the cylindrical member when the vane is in the first position and an opposite exterior surface that is convex at the leading edge and that faces outwardly when the vane is in the first position.

6. A turbine as claimed in claim 5, wherein the interior surface is concave.

7. A turbine as claimed in claim 5, wherein the interior surface is flat.

8. A turbine as claimed in claim 5, wherein there is a void between the cylindrical member and the vanes permitting unobstructed movement of air therethrough.

9. A turbine as claimed in claim 6, wherein the interior surface has an effective radius of curvature and the convexity of the exterior surface has a radius of curvature smaller that the effective radius of curvature of the interior surface.

10. A turbine as claimed in claim 1, wherein each vane is pivotable about a longitudinal pivot axis for adjustment between the first position and the second position and the pivot axes of the vanes are spaced about the longitudinal axis of the drum-like frame such that each vane is spaced substantially an equal distance from each adjacent vane.

11. A turbine as claimed in claim 10, wherein the cylindrical member has a diameter greater than the distance between adjacent vanes.

12. A turbine as claimed in claim 11, wherein there is a void between the cylindrical member and the vanes permitting unobstructed movement of air therethrough.

13. A turbine as claimed in claim 1, wherein there is a void between the cylindrical member and the vanes permitting unobstructed movement of air therethrough.

14. A turbine as claimed in claim 1 wherein the cylindrical member is of circular cross-section.

15. A turbine as claimed in claim 1, wherein each vane is arcuate and has an interior surface that faces inwardly toward the cylindrical member when the vane is in the first position and an opposite exterior surface that is convex at the leading edge and that faces outwardly when the vane is in the first position.

16. A turbine as claimed in claim 1, wherein each vane is pivotable about a longitudinal pivot axis for adjustment between the first position and the second position and the pivot axes of the vanes are spaced about the longitudinal axis of the drum-like frame such that each vane is spaced substantially an equal distance from each adjacent vane.

17. A turbine as claimed in claim 1, wherein there is a void between the cylindrical member and the vanes permitting unobstructed movement of air therethrough.

* * * * *